(No Model.) 4 Sheets—Sheet 1.

R. A. L. BLONDEL.
WATER CLOSET FLUSHING TANK.

No. 540,137. Patented May 28, 1895.

WITNESSES
Fred G. Dieterich
Amos W. Hart

INVENTOR
Richard A. L. Blondel.
BY
Munn & Co
ATTORNEYS

THE NORRIS PETERS CO., PHOTO-LITHO., WASHINGTON, D. C.

(No Model.) 4 Sheets—Sheet 2.
R. A. L. BLONDEL.
WATER CLOSET FLUSHING TANK.

No. 540,137. Patented May 28, 1895.

WITNESSES:
INVENTOR
Richard A. L. Blondel.
BY
ATTORNEYS.

(No Model.) 4 Sheets—Sheet 3.
R. A. L. BLONDEL.
WATER CLOSET FLUSHING TANK.
No. 540,137. Patented May 28, 1895.
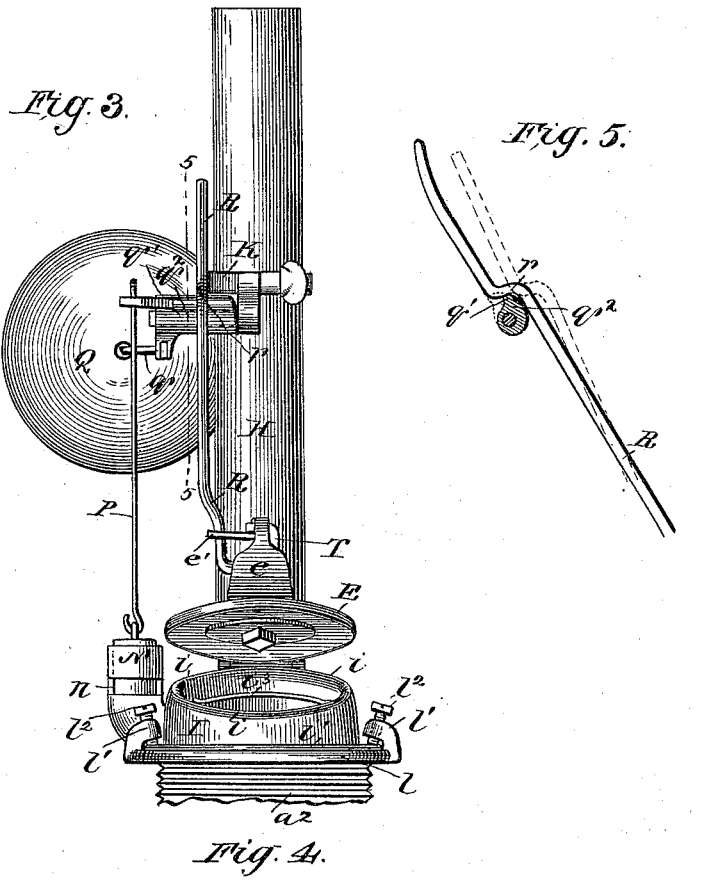
WITNESSES:
Fred G. Dieterich
Amos W. Hart
INVENTOR
Richard A. L. Blondel.
BY 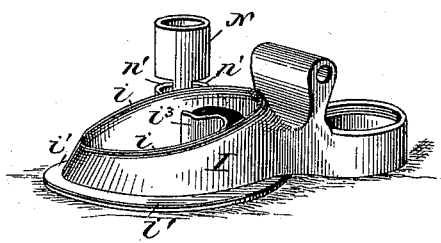
ATTORNEYS.

(No Model.) 4 Sheets—Sheet 4.
R. A. L. BLONDEL.
WATER CLOSET FLUSHING TANK.
No. 540,137. Patented May 28, 1895.
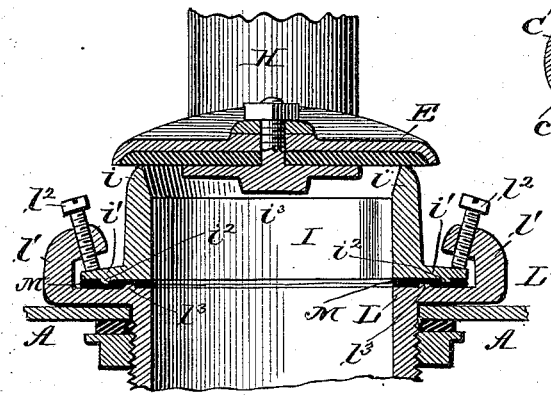
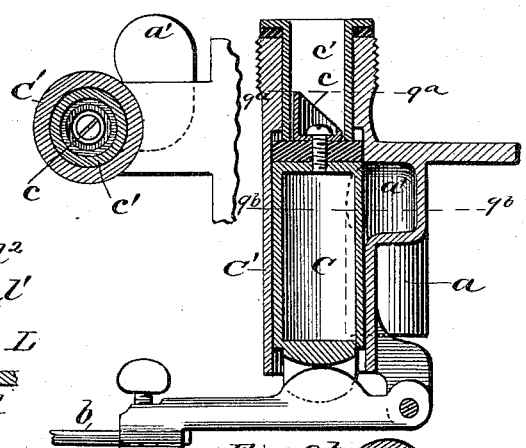
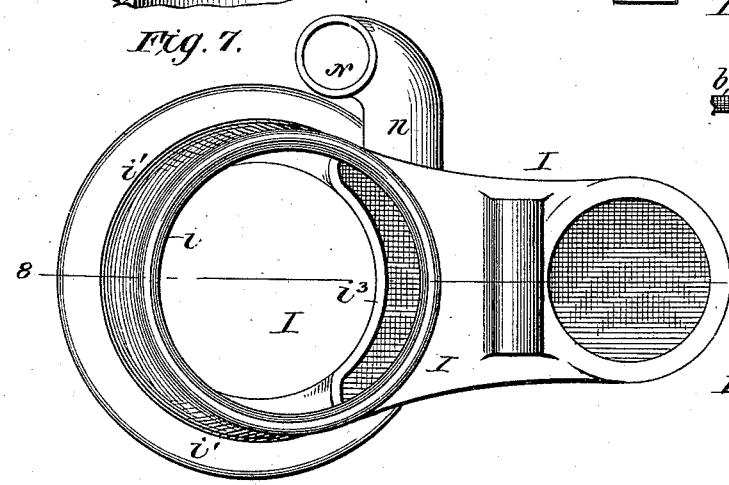
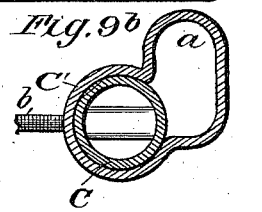
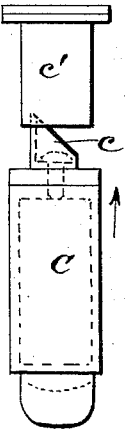
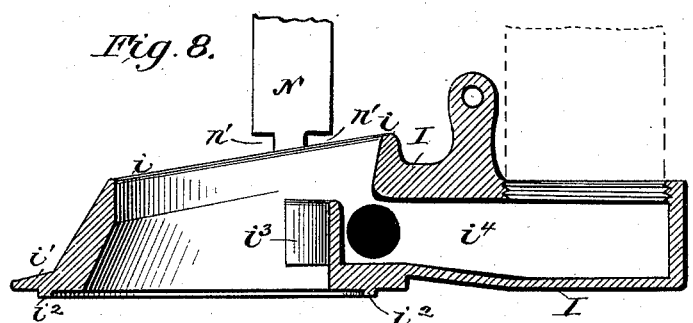
WITNESSES:
Fred G. Dieterich
Amos W. Hart
INVENTOR
Richard A. L. Blondel
BY Munn & Co.
ATTORNEYS.

UNITED STATES PATENT OFFICE.

RICHARD A. L. BLONDEL, OF BOSTON, MASSACHUSETTS.

WATER-CLOSET FLUSHING-TANK.

SPECIFICATION forming part of Letters Patent No. 540,137, dated May 28, 1895.

Application filed April 28, 1894. Serial No. 509,359. (No model.)

*To all whom it may concern:*

Be it known that I, RICHARD A. L. BLONDEL, residing at Boston, Suffolk county, in the State of Massachusetts, have invented a new and useful Improvement in Water-Closet Flushing-Tanks, of which the following is a specification.

My invention pertains to certain improvements in flushing-tank valves, which regulate the discharge of water into water-closet bowls.

The improvements are embodied in the construction and combination of parts hereinafter described, whereby the discharge-valve, valve seat and attachments are removably and adjustably connected with the "spud" secured in the bottom of the tank, also whereby the disagreeable sound caused by the passage of air through the overflow pipe, at the time of the discharge of water from the tank, is prevented, and, lastly, whereby the flushing, or main discharge valve is automatically locked and held open for a certain length of time, and then released and caused to close slowly and noiselessly.

Figure 1:
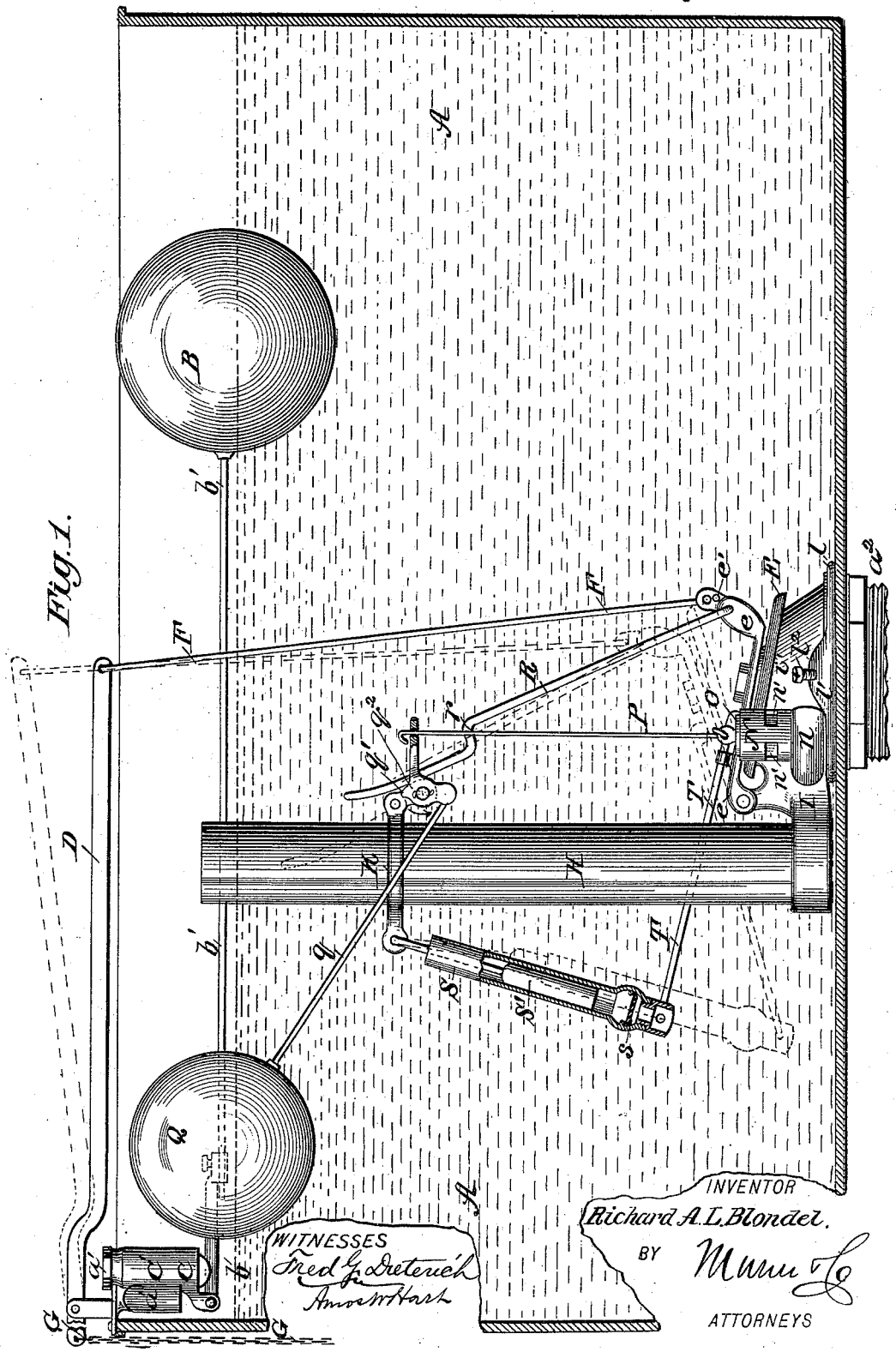
Figure 2:
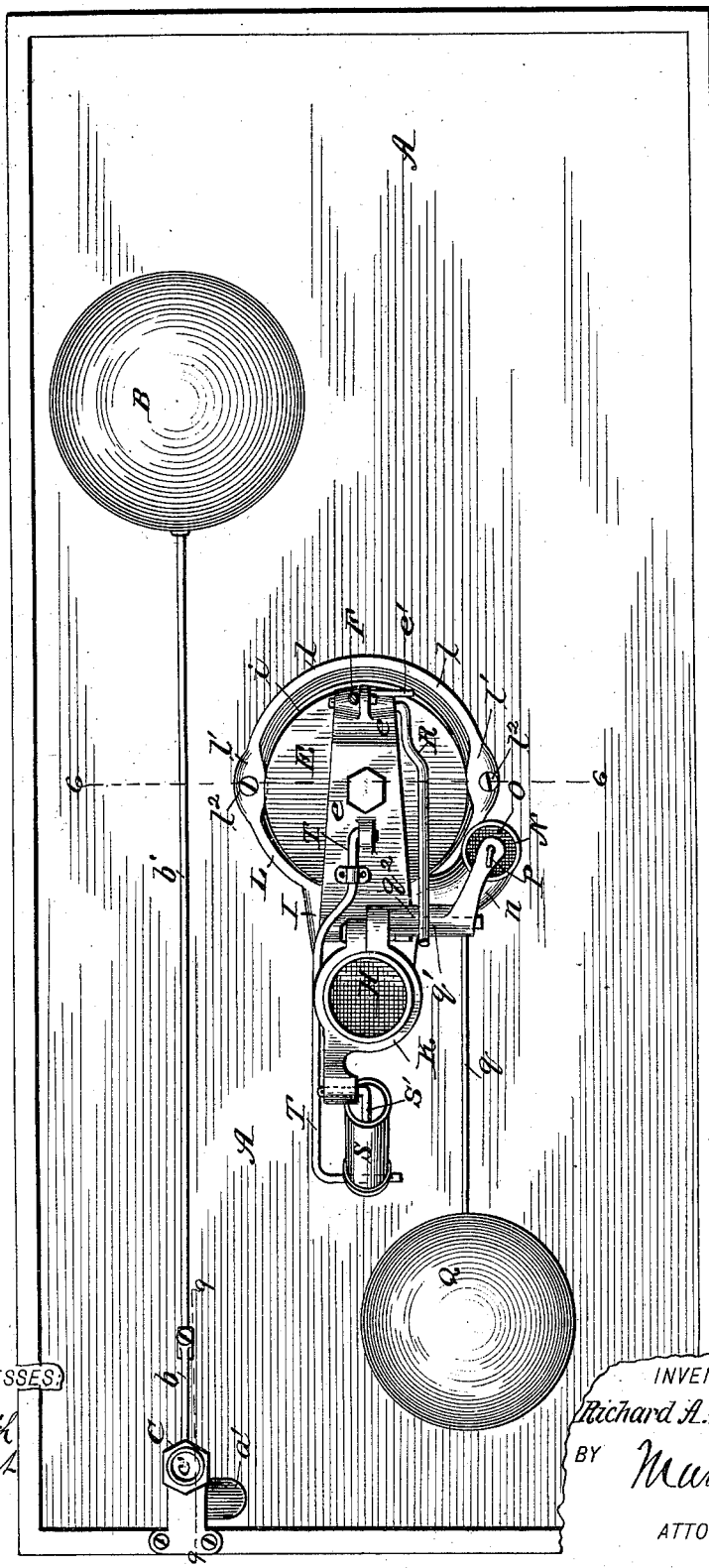

In the accompanying drawings, (four sheets,) Figure 1 is a vertical longitudinal section of a service-tank with my improvements attached, and Fig. 2 is a plan of the same.
Fig. 3 is a front view of the main discharge-valve, (shown open,) valve-seat, and attachments, including the "spud." Fig. 4 is a perspective view of the hollow base-piece, with valve-seat, diaphragm, and after-filling cylinder. Fig. 5 is a section on line 5 5, Fig. 3. Fig. 6 is an enlarged cross-section on line 6 6, Fig. 2. Fig. 7 is an enlarged plan of the valve-seat and hollow base-piece, of which it forms a part. Fig. 8 is a vertical section on line 8 8 of Fig. 7. Fig. 9 is an enlarged central vertical section of the inlet-valve and attachments. Fig. 9$^a$ is a cross-section on line 9$^a$ 9$^a$ of Fig. 9. Fig. 9$^b$ is a cross-section on line 9$^b$ 9$^b$ of Fig. 9. Fig. 10 is a side view of the inlet-valve and its tubular seat.

As shown in Figs. 1 and 2 the tank A has the inlet at $a'$ and the outlet at $a^2$, as usual. A ball float, B, having a pivoted lever arm, $b$, $b'$ automatically controls the position of the inlet valve, C, which slides vertically in a casing, C'. (This valve will be presently further described with reference to details shown in Figs. 7 to 10 inclusive.)

The lever, D, for operating the discharge or flushing valve, E, through the medium of a rod, F, is pivoted and weighted as usual, and operated by a pull-wire, or chain, G, which, in practice, may hang free or be attached to a hinged closet seat (not shown) which is held normally raised.

The vertical overflow pipe, H, is fixed at its lower end in a chambered support or base-piece, I, one end of which is extended horizontally to form an open seat, $i$, for the main discharge or flushing valve E, and also serves as a support for a clamp or bracket, K, to which certain attachments are made, as will be presently described. Such chambered base-piece, I, is detachably connected with the "spud," or screw coupling, L, which is soldered to the bottom of the tank, A, and thus forms a permanent attachment of the same. The aforesaid "spud" L, (Fig. 3,) is provided with a horizontal flange, or base, having a slightly raised rim, $l$, and also with two opposite vertical ears, $l'$, that are formed with inwardly-extending flanges through which vertical clamp-screws $l^2$, work as shown. The base of the valve seat has a projecting horizontal flange, $i'$, on its front and lateral sides, which is adapted to pass beneath said flanges, $l'$, of the "spud" so that it may be held in place by means of the clamp-screws $l^2$, yet readily detached when required. Such adaptation of the base-piece and valve seat, $i$, for detachment is a practically important feature, for the following reasons: It enables the valve seat, $i$, to be inserted from either side, so that if the tank, A, is sold for a right-hand tank, and it is necessary to change it to a left-hand tank, this may be easily and quickly effected by loosening the clamp-screw, $l^2$, and slipping the flange, $i'$, of the valve seat out from the spud, L, and sliding it into place from the other side of the spud; or if the valve E is injured, and it is required to remove it, this may be done in the same manner, after having tied up the float lever, $b$, so that the water supply is cut off. In the case of flushing valves whose seats are screwed on the spud, the latter cannot be placed very near the back of the tank without preventing rotation of the valve seats, or at least rendering it difficult to turn them to secure them properly in place; and a difficulty also arises in attempting to screw the valve-seats tightly in place and yet leave the overflow pipe in the proper position. By my improvement, the spud may be placed close to the wall of the tank without affecting the attachment and detachment of the valve-seat and its connected parts, and the attachment may be made from either side.

The aforesaid rim, $l$, of the spud, L, surrounds and serves to hold in place an annular washer M, (Fig. 8,) made of some elastic material, preferably leather or rubber. The washer seats on the base of the spud, L, which has a circular rib, $l^3$, that is useful in forming a water-tight joint between the spud and less flanged base of the valve seat, $i$. A corresponding ring rib, $i^2$, is formed on such base of the valve seat but has a slightly greater diameter than the spud rib $i^3$. When the base-piece, I, is clamped in place on the spud, the larger rib, $i^2$, closes upon the washer M, outside of the smaller rib, $i^3$, and the washer is compressed between them, with the effect of forming a close and perfectly water-tight joint.

I provide, by the special construction about to be described, for preventing the objectionable sound, or gurgling produced by air entering the overflow pipe when water is discharging through the valve seat, $i$, for flushing.

It will be observed (Figs. 1, 3, and 4) that the axis of the opening through the valve seat, $i$, does not coincide with the vertical opening in the spud, L, but is inclined backward toward the overflow pipe, H, and that its rear portion is divided by a short vertical partition, $i^3$, (Figs. 4, 7, and 8) that separates its larger or front portion from the chamber or passage, $i^4$, leading back to the overflow pipe, H. Said partition has about half the height of the vertical portion or rim of the valve seat, $i$, and is located about one half of an inch forward of the rear portion of such rim, the intervening space serving as the mouth of the said passage, $i^4$, leading from the overflow pipe H. It is apparent, that, upon raising the flushing valve, E, a portion of the water escaping from the tank, A, through the outlet thus provided will fall into the space behind the partition, $i^3$, and not only fill the overflow passage, $i^4$, but, keep it full during the time of discharge so that suction of air through the overflow, H, and the disagreeable noise ordinarily produced by it, is prevented. As an aid in attaining these results, i. e., keeping the chamber, $i^4$, full of water, and more especially for refilling the trap of the water-closet basin in case its contents should be siphoned out, I employ the following means:

The cylinder, N, (Figs. 1, 2, and 4,) which I term the after-filling cylinder, is connected with the base piece, I, at a point behind the partition, $i^3$, so that water flowing through the said cylinder passes into the overflow passage, $i^4$, and over the partition, $i^3$, before reaching the discharge outlet. To provide for attachment of such cylinder, N, the base piece, I, has a lateral screw-threaded boss, into which the curved neck, $n$, of the cylinder, N, is screwed. Thus the cylinder is adapted for easy attachment and detachment. (It may however be permanently attached to the boss, by soldering, if preferred.)

The cylinder, N, has inlet openings, $n'$, at its base, and the plug or valve, O, that works therein, fits loosely, so that water may flush its sides and prevent it sticking or sliding with undue friction by reason of accumulation and adhesion of any solid sedimentary substance. The valve, O, is also made slightly longer than the cylinder, N, (Fig. 1,) so that sediment, &c., deposited on the head of the valve will be washed off without undue accumulation and without passing between the valve and side of the cylinder. The said valve closes and remains normally closed by gravity, but is raised by means of a rod, P, that has a sliding connection with the rigid, forwardly-extended arm of a lever, $q$, having a float, Q, at its free extremity. Said lever is journaled on a horizontal fulcrum projecting from a ring bracket, K, clamped on the overflow pipe, H. It will be seen, that, when the main discharge valve, E, is opened, this float, Q, will begin to descend with the fall of water in the tank, A, and eventually raise the valve, O, of the after-filling cylinder, N, so that water will escape through the latter. This will continue until the float has reached the same position at which it started to raise valve O.

The operation of valve, E, is as follows: It is normally seated, but is raised in the usual way, namely, by tilting the lever, D, through the medium of pull-wire or chain, G. When raised, as shown by dotted lines, Fig. 1, and full lines, Fig. 3, it is temporarily held open by means of a trip-rod, R, (Fig. 6,) which is hinged to the valve arm, $e$, and provided at its upper end with an angle or catch, $r$, which engages an angular shoulder $q'$ formed on the rocking fulcrum, $q^2$, of the float lever, $q$, which is connected with the valve, O, of the after-filling cylinder, N; that is to say, the fulcrum, $q^2$, has an upward extension or beveled enlargement, $q'$, over which the shoulders of the trip-rod, R, catch as shown by full lines, Fig. 5, when the main valve, E, is raised. As the water falls in the tank, A, the float Q goes with it and turns the fulcrum, $q^2$, so that at a certain point it slips out of engagement with the trip-rod, R, and thus releases the valve, E. The latter would at once fall on its seat, $i$, and thus produce a noise or clatter, but for the resistance offered by the retarding device, S, which is constructed as follows, (see Fig. 1:) It is composed of a cylinder having a valve, $s$, and a plunger, $s'$, which slides freely in said cylinder. The lower end of the latter is connected, by a hinge joint, with a rigid arm, T, attached to and extending rearwardly from arm $e$ of the discharge valve, E, and the plunger, $s'$, is pivoted to an arm of the bracket, K. The disk valve, s, of the cylinder, S, seats downward. It will be seen that when the valve, E, is opened, the cylinder, S, is drawn downward, so that the plunger or piston, s', slides upward therein, and water raises the valve s, and is thus freely admitted to the space behind the plunger s'; but when the valve, E, is closing, the cylinder, S, is forced upward, so that the plunger, s', slides downward therein and the valve, s, also closing on its seat, the water held in the space between the valve and plunger is slowly forced upward past the plunger, which is fitted somewhat loosely in the cylinder to permit such action.

One of the improvements in the inlet valve, C, (Figs. 1, 9, $9^a$, $9^b$, and 10) consists in providing it with a graduated cut-off, c—that is to say, when the valve, C, is closed, as shown in Fig. 9, its head, which is provided with a leather washer closes on the lower end of a removable tubular seat, c', and on such head of the valve is secured a beveled piece, c, which constitutes the cut-off. The same is recessed and fastened by a screw, its inclined side being next or adjacent to the outlet, a'. It will be seen, that, when the valve, C, is closing (Fig. 10), the cut-off, c, will enter the tubular seat, c', before the valve is seated, and thus gradually arrest the inflow, and almost entirely cut it off before the valve seats. The valve C, is, therefore enabled to close more easily than would be otherwise practicable. The tubular valve-seat, c', is made of such length that it projects into the valve space or water space of the casing, C', and hence, if its inner end becomes worn or cut out, it may be ground off several times without reducing its length so as to destroy the required valve seat.

A further improvement consists in arranging the valve-casing, C', and valve, C, vertically, and placing the valve between the float, B, and the fulcrum of its lever, b, so that the latter supports the valve, as shown. The lever b, has a bore in its free end to receive the detachable float rod b', and the two are secured together by means of a clamp-screw. This construction is important, since it enables the float to be readily detached so that the lever proper b, may be dropped when it is required to remove the valve for repairs. The same construction also enables the float to be easily and quickly adjusted back, in case the lever as a whole be found slightly too long.

As shown in Figs. 1, 2, and 3, a pin e' projects laterally from the head of the valve arm e, and is adapted to serve as a stop for the valve-locking rod R, preventing it falling forward from any cause.

The following is a brief resume of the operation of the apparatus: supposing the discharge valve E, to be seated, the tank A filled, and the supply or inlet thereby closed, as shown in Fig. 1, then upon tilting the lever D, by tension on the pull-cord, or wire, or chain G, the said valve is raised, as shown in dotted lines, Fig. 1, whereby its trip rod R slides up into engagement with the rocking catch $q^2$, of the float lever q, and is thereby locked in open position, while the cylinder S, is drawn simultaneously downward on the piston or plunger s. The water begins rapid discharge the instant the valve E, begins to open, and continues with undiminished velocity until the ball float Q, falls far enough to release the trap rod R, which position is also shown by dotted lines. Then the valve E, begins to close by gravity, but is hindered by the water-cushion device S, from doing so so quickly as to make an audible clatter. Just before the trip-rod R is released, the valve of the after-filling cylinder N, begins to rise, this being effected by the engagement of the short arm of the float lever q, with the shoulder r of the valve rod R. Hence, water passes through the openings n', in cylinder N, and passes into the overflow passage $i^4$ into the common discharge or outlet $a^2$. This flow of water through the cylinder N continues after the discharge valve E, has closed, so that in case the water in the trap of the closet bowl should have been siphoned out, it will be refilled. When the discharge from the tank has lowered the contents of the latter sufficiently, the valve C drops and opens the inlet passage so that inflow begins, the tank refills, and both floats B, and Q, rise simultaneously to their former normal positions, and the apparatus is thus ready to act again in a manner already described.

With the improvements before specified, I produce an automatic apparatus whereby several of the chief defects of others of its class are effectually removed or remedied.

Having thus described my invention, what I claim is—

1. As an improvement in flushing-tank attachments hereinbefore described, the combination, with the tank and the "spud," consisting of a flanged, horizontal base, having opposite inwardly-curved side ears, of the valve attachment composed of a hollow body provided with a vertical passage, valve, and valve seat, and having an integral horizontal flange adapted to enter from either of two directions between the ears of the spud, and screws, working in said ears, for clamping said attachment upon the spud, as shown and described.

2. In a valve attachment for flushing-tanks, the combination of the overflow pipe, the hollow base-piece having the longitudinal overflow passage, a partition arranged at the discharge end of such passage, a tubular valve-seat within which such partition is arranged and an after-filling cylinder which communicates with the overflow passage in rear of said partition, as shown and described.

3. In a valve attachment for flushing-tanks, the combination with the hinged, main discharge valve, tubular valve-seat and hollow base-piece, a transverse partition arranged therein, the after-filling cylinder and valve therefor, the float having a rocking fulcrum with forwardly extended arm, a rod connecting said arm with the after-filling valve, the overflow pipe serving as a support for said fulcrum, a rod pivoted to the discharge valve and having a locking shoulder which engages with the said fulcrum when the valve rises, and is released therefrom simultaneously or nearly so with the rise of the after-filling valve, as shown and described.

4. In a valve attachment for flushing tanks, the combination with a valve seat and the hinged, main discharge valve, of a valved, open-end cylinder connected with the valve, and a piston or plunger pivoted to a fixed support and slidable in said cylinder, as shown and described to operate as specified.

5. In a valve attachment for flushing tanks, the combination with a valve seat and hinged main discharge valve, a rigid rearwardly-extended arm attached to said valve, an open-end cylinder having a loose-joint connection with the free end of said arm, a valve arranged in the cylinder and adapted to open upward and seat downward, a piston or plunger fitting loosely and slidable in the cylinder, which is arranged in the tank below the normal water level, as shown and described, to operate for retarding the closing of the valve as specified.

6. In a valve attachment for flushing tanks, the combination with the tank proper and a tubular inlet therefor having a lateral discharge passage, of a sliding valve, a beveled piece attached to the head of the valve and adapted to enter the inlet, the same being arranged with its inclined side adjacent or opposite the outlet as shown and described.

RICHARD A. L. BLONDEL.

Witnesses:
JAMES R. GROVE,
GEORGE W. FLOOD.